Dec. 25, 1956  C. W. LINCOLN ET AL  2,775,664
NEUTRAL SAFETY AND BACK-UP LIGHT SWITCH
Filed Oct. 30, 1952  2 Sheets-Sheet 1
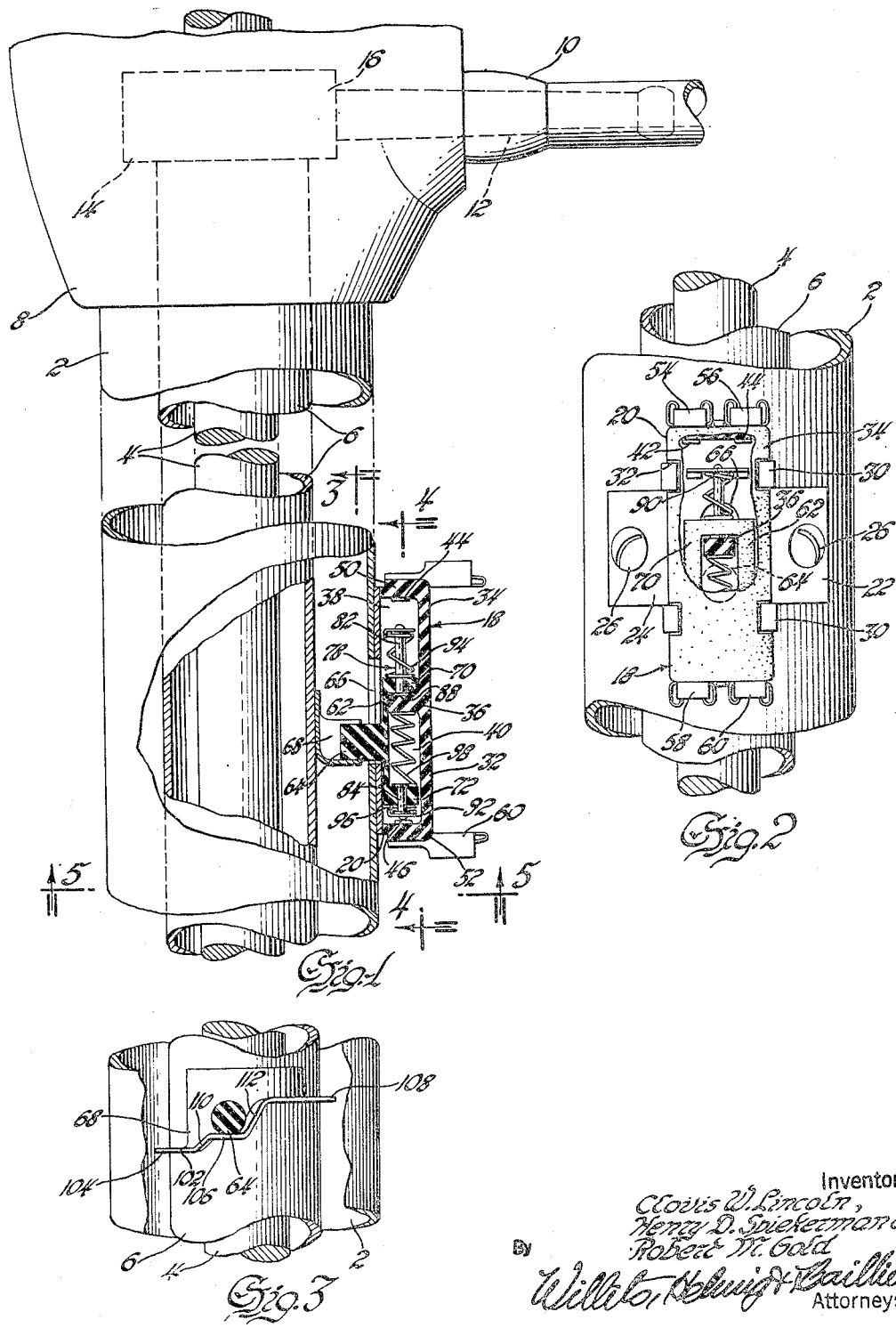
Inventors
Clovis W. Lincoln,
Henry D. Spiekerman &
Robert M. Gold
By
Willis, Helwig & Baillio
Attorneys Dec. 25, 1956   C. W. LINCOLN ET AL   2,775,664
NEUTRAL SAFETY AND BACK-UP LIGHT SWITCH
Filed Oct. 30, 1952   2 Sheets-Sheet 2

Inventors
Clovis W. Lincoln,
Henry D. Spieketman &
Robert W. Gold
By Willets, Helmig & Baillio
Attorneys United States Patent Office 2,775,664
Patented Dec. 25, 1956

2,775,664

NEUTRAL SAFETY AND BACK-UP LIGHT SWITCH

Clovis W. Lincoln and Robert M. Gold, Saginaw, Mich., and Henry D. Spiekerman, North Hollywood, Calif., assignors to General Motors Corporation, Detroit, Mich., a corporation of Delaware Application October 30, 1952, Serial No. 317,671

10 Claims. (Cl. 200—61.54)

This invention relates to safety switches and more particularly to control switches operable in response to movement of the transmission control lever of vehicles.

In vehicles provided with automatic transmissions, it is imperative that the engine starter button be rendered inoperative except when the transmission is in the neutral position, since the vehicle will otherwise be instantly placed in motion when the button is depressed. To eliminate the possibility of the operator inadvertently failing to properly position the transmission control before starting, it is customary to place in series with the conventional push-button starter switch a second switch which is energized only upon movement of the transmission control lever into the neutral position. In this way, the starter is rendered responsive to the push-button switch only when the transmission control lever is in neutral.

In addition to providing safety switch means in conjunction with the starting of the vehicle, it is highly desirable that a visual indication be provided when the vehicle operator wishes to proceed in reverse. In order to reduce the danger resulting from forgetfulness or an inadequate hand signal by the operator, many vehicles are provided with one or more suitable lamps at the rear the lighting of which is controlled by a switch responsive to the movement of the transmission control to the reverse position. This not only provides a visual indication of the operator's intention but also provides a material visual aid to the operator when proceeding in reverse at night.

Although a small proportion of vehicles are now provided with both safety devices as optional accessory equipment, such installations are customarily individually mounted, susceptible to misalignment, and involve considerable expense. In the past no such device has been available which is economical and which is adapted for rapid assembly techniques employed in volume automotive production.

It is therefore an object of the invention to provide a unitary safety switch mechanism which is adapted to selectively energize either back-up illuminating and indicating lights or the starter circuit of a vehicle.

Another object is to provide a unitary back-up light and neutral safety switch mechanism which is durable in construction and economical to manufacture.

Still another object is to provide a safety switch of the type described which is adapted for rapid assembly and adjustment.

A further object is to provide a safety switch mechanism which is protected from the corroding effects of the elements.

Yet another object is to provide a safety switch mechanism which is disposed in such a manner as to obviate the risk of damage or accidental misalignment in the course of normal servicing of the vehicle.

Other objects and advantages of the present invention will appear more fully in the detailed description and accompanying drawings, wherein a preferred embodiment of one form of the invention is clearly shown.

In the drawings:

Figure 1 is a front elevational view of the steering column of a motor vehicle showing the transmission control mechanism incorporating the invention, certain parts being broken away and certain parts being shown in section.

Figure 2 is a side elevational view of a portion of the steering column showing the position of the unitary switch mounted thereon, certain parts being broken away and in section.

Figure 3 is a side elevational view of the switch control mechanism, certain parts being broken away and certain parts being shown in section.

Figure 4:
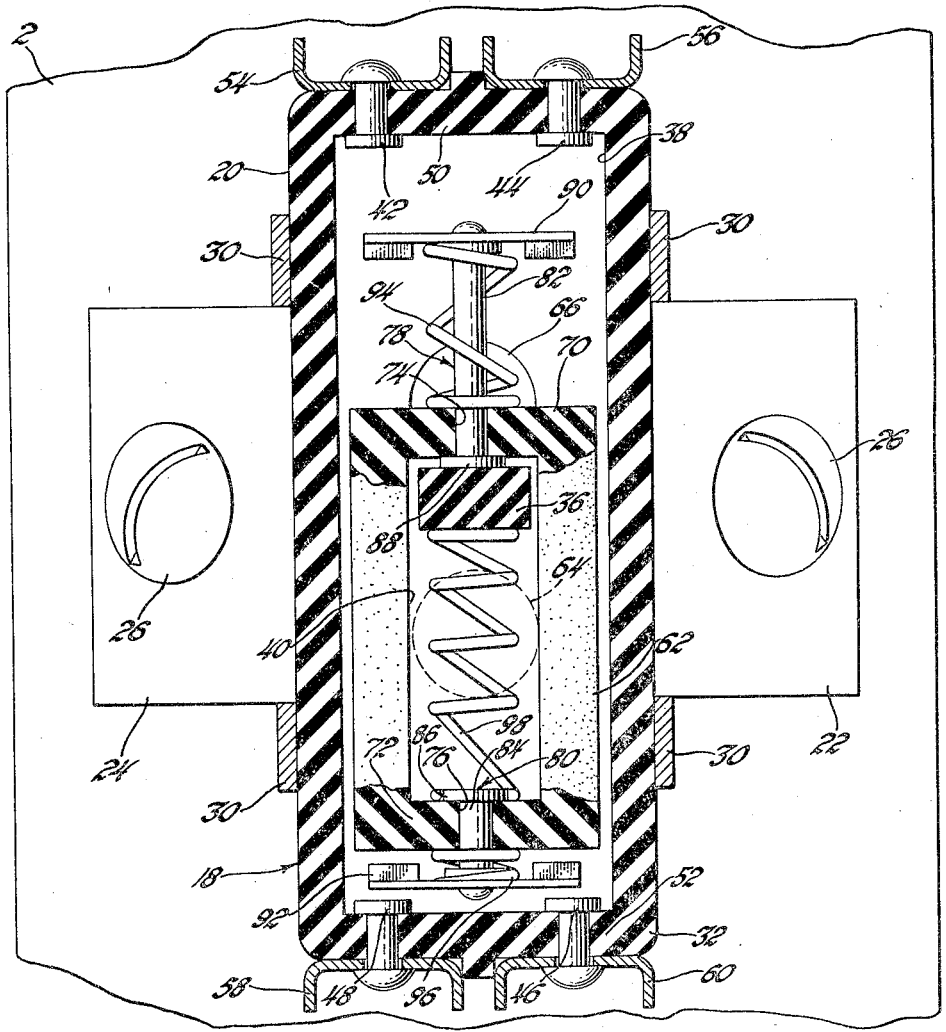
Figure 4 is an enlarged view, partly in section, similar to Figure 2.
Figure 5:
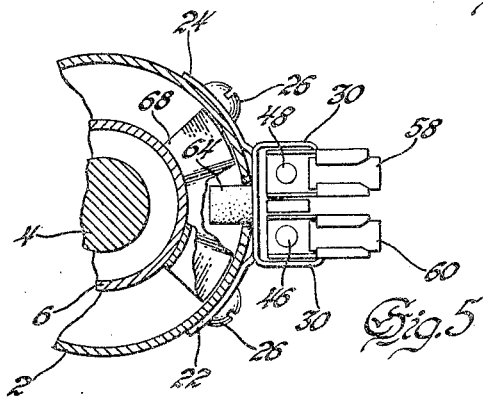
Figure 5 is a cross sectional plan view taken along the line 5—5 of Figure 1, showing the disposition of the unitary switch with reference to the steering column and the steering column transmission control.

Referring now to the drawings and particularly to Figure 1, there is shown a portion of a vehicle steering column 2 having a steering shaft 4 disposed concentrically therein which is surrounded by a rotatable transmission control tube 6. A rotatable hub portion 8 is mounted at the upper end of steering column 2, and disposed immediately beneath the steering wheel, not shown. Hub portion 8 is provided with a hollow radially extending sleeve portion 10 which is adapted to receive manually operable transmission control lever 12. Control lever 12 extends through the sleeve 10 and pivotally engages collar 14 secured on the upper end of the control tube 6 as shown at 16. The pivotal connection 16 is disposed at right angles to the longitudinal axis of the control tube 6 to permit slight upward movement of the lever 12. It will be apparent that the sleeve 10 serves as a fulcrum for the lever 12 whereby lifting movement of lever 12 will cause the tube 6 to shift axially downward slightly. In transmission controls designed to move progressively in one plane to the various positions of adjustment, it is customary to provide a mechanical detent, not shown. The detent arrests the movement of the control lever just before reaching the reverse position to overcome the danger of accidentally shifting into reverse. To disengage the detent requires only slight upward movement of the transmission control lever and then resumption of the rotation into the reverse position.

A suitable distance below the transmission control collar 8, a multi-positioned switch 18 is secured to the steering column 2. The casing 20 of switch 18 is formed with apertured laterally extending ears 22 and 24 which are secured to steering column 2 in any suitable manner, such as by machine screws 26. Casing 20 is composed of a sheet metal elongated U-shaped member having tab portions 30 which are clinched into recesses 32 in the main body of the switch 18 to retain it in position. Switch 18 comprises a shallow rectangular box-like member 34 constructed of a suitable insulating material and is provided with a central vertical finger or projection 36 which divides the interior into two aligned rectangular recesses 38 and 40. Box-like member 34 has partially embedded in wall 50 thereof a pair of transversely aligned contact members 42 and 44 and partially embedded in the wall 52 a similar pair of contacts 46 and 48. Contact terminals 54 and 56 are secured, respectively, to contacts 42 and 44, while contact terminals 58 and 60 are likewise secured to contacts 46 and 48, respectively. These terminals are adapted for connection with lead wires, not shown, for the back-up lights and the starter circuit, respectively. To bridge contacts 42 and 44 or 46 and 48, a contact bridge carrier 62 is provided which is mounted for longitudinal slidable movement in member 34.

Contact bridge carrier 62 is of generally rectangular box construction and is also formed of a suitable insulating material. An inwardly projecting operating pin 64 is formed integrally with carrier 62 and extends through a longitudinal aperture 66 formed in the steering column 2 and into the annular space between the steering column 2 and the transmission control tube 6 for engagement with a cam 68 secured to said control tube. End portions 70 and 72 of contact bridge carrier 62 extend, respectively, into the recesses 38 and 40 formed in the interior of box member 34. End portions 70 and 72 are provided with longitudinally extending apertures 74 and 76, respectively, for receiving yieldably slidable contact bridging members 78 and 80. Bridging members 78 and 80 comprise rod portions 82 and 84 having elongated bridging conductors 90 and 92 mounted on their respective outer ends and cap members 86 and 88 mounted on the respective inner ends thereof. Coil springs 94 and 96 are concentrically disposed about the rod portions 82 and 84 of members 78 and 80 and extend between the outwardly offset portions 70 and 72 of carrier 62 and bridging conductors 90 and 92, respectively, to yieldingly urge said members 78 and 80 longitudinally away from said offset portions 70 and 72. A third relatively heavy gauge coil spring 98 is disposed between the transverse web portion 36 of box member 34 and the inner surface of offset portion 72 to urge the entire contact bridge carrier 62 longitudinally toward one end of said box member. It will therefore be seen that in the absence of counteracting pressure on the operating pin 64, the contact bridge carrier 62 will cause contact bridging conductor 92 to bridge contacts 46 and 48 to close the circuit between the starter switch, not shown, and the starter motor, not shown, while pressure on the operating pin 64 sufficient to overcome the spring 98 will cause the carrier 62 to move longitudinally away from and to break the said circuit to render the starter switch inoperative. As the carrier 62 moves progressively toward the opposite end of the box member 34, bridging conductor 90 on contact bridging member 78 approaches and bridges contacts 42 and 44 to close the circuit between the power source, not shown, and back-up lights, not shown. Since both contact bridging members 78 and 80 are yieldingly urged outwardly away from the contact bridge carrier 62, limited movement of the carrier 62 may take place after either bridging member 78 or 80 initially engages its respective contacts, thereby permitting the additional axial movement of tube 6 necessary to disengage the detent mechanism.

To actuate the operating pin 62 in response to movement of the transmission control lever 12 and to provide correlation between the position of the control lever 12 and the desired switch energizing position, the cam plate 68 secured on the transmission control tube 6 is provided with a segmental stepped flange portion comprising three stepped horizontal rest surfaces 104, 106 and 108 spaced progressively upwardly and connected by inclined cam surfaces 110 and 112. As shown particularly in Figure 3, it will be seen that as the control tube 6 is rotated clockwise in response to swinging movement of the transmission control lever 12, the cam plate 68 will impart longitudinal upward movement to the operating pin 62. As the tube 6 is rotated clockwise from the neutral position the inclined surface 110 of the flange 68 engages pin 64 causing it to rise to the level of the intermediate horizontal surface 106. As the intermediate horizontal surface 106 passes across the operating pin, the switch "dwells" or remains in this position of adjustment. Continued rotation of the tube in a clockwise direction causes the second inclined surface 112 to engage pin 64 and urge it upwardly to the level of upper horizontal surface 108. Upon counterclockwise rotation of the tube 6 pin 64 will progressively move downwardly in response to the urging of spring 98 as the progressively stepped flange 102 passes across the longitudinal plane of the pin 64.

Transmission controls adapted for swinging movement in a single plane usually have the "neutral" and the "reverse" positions at opposite limits of the range of movement, necessitating a relatively large degree of rotary movement therebetween. Since the total linear movement of the switch is relatively slight, it will be apparent that the cam 68 must be shaped in such a manner that its total rotary movement will provide a longitudinal increment of movement equal to the range of movement of the switch. While a straight inclined cam may be used to provide the necessary ratio between rotary movement of the tube and linear movement of the switch, it has been found to be desirable that the starter circuit be quickly and positively deenergized upon slight movement of the control from neutral to a drive position. The stepped structure of the cam profile shown in Figure 3 has been found to be particularly suitable for providing the necessary overall ratio while conferring the additional advantage of permitting intermediate variation or accelerated ratio. It will be seen that the angle of inclination of both surfaces 110 and 112 is greater than the theoretical angle of inclination necessary to secure the required coordination between control tube and the switch. By virtue of the relatively steep inclination of surface 110, accelerated and positive breaking of the starter circuit is assured with but a small degree of movement of the control lever. Since the cam has a level center position, the switch will "dwell" in an intermediate neutral position through the range of forward positions until the control approaches the reverse position, where the cam is again sharply inclined. Continued rotation of the control into the reverse position will then cause the switch bridging member to be rapidly and positively moved into the back-up light circuit bridging position.

To correct slight variations in coordination between the transmission control positions and the switch energizing positions it is only necessary to loosen the switch casing screws and adjust the switch slightly up or down along the longitudinal axis of the steering column until a perfectly coordinated action is achieved. It will also be evident that any slight variation in the arc of movement from one transmission control to another will be compensated for by the resilient characteristic of the switch bridging member.

From the foregoing description it is seen that an improved and highly novel mechanism has been devised which is simple to install and smooth and efficient in operation.

While but a single embodiment of the invention has been shown and described, it will be apparent that other changes and modifications may be made therein. It is therefore not intended to limit the invention to the single embodiment shown but only by the scope of the claims which follow.

We claim:

1. In combination, a steering column, rotatable transmission control means disposed adjacent said column, a longitudinally slidable switch secured on said column, said switch having spaced apart circuit closing positions and being normally urged to one of said circuit closing positions, and stepped flange means on said control means continuously yieldably engaged by said switch and effective to longitudinally actuate said switch in response to rotary movement of said control means.

2. In combination, a steering column, rotatable transmission control means disposed on said column, an electrical switch adjustably attached to said column, oppositely facing sets of electrical contacts provided in said switch, a longitudinally slidable contact bridging member operatively associated with said switch, yieldable means urging said bridging member into engagement with one of said sets of electrical contacts, operative means on said bridging member extending interiorally of said steering column, and means on said control means engaging said operative means for moving said slidable bridging member longitudinally between said sets of contacts.

3. In combination, a steering column, a transmission control tube concentrically disposed relative to said column for rotatable movement therein, a multi-positioned electrical switch adjustably secured on said column, longitudinally slidable circuit closing means for said switch, a cam secured on the periphery of said control tube and continuously yieldably engaging said circuit closing means, said cam being adapted upon rotation to impart linear movement to said circuit closing means, and a lever attached to said transmission control tube for manually actuating said tube through its range of adjustment.

4. In combination, a steering column, a transmission control tube concentrically disposed relative to said column for rotatable movement therein, a multi-positioned electrical switch adjustably secured on said column, longitudinally slidable bridging means recessed in said switch, means integral with said bridging means and extending into said steering column, and means on said control tube engaging said inwardly extending integral means to impart intermittently interrupted linear movement to said bridging means.

5. In combination, a steering column, a transmission control tube concentrically disposed within said column for rotatable movement therein, a multi-positioned electrical switch adjustably secured on said column, longitudinally slidable bridging means recessed in said switch, means integral with said bridging means and extending into said steering column, and means on said control tube engaging said inwardly extending integral means to impart alternately accelerated and retarded linear movement to said bridging means in response to constant rate movement of said control tube.

6. In combination, a steering column having an elongated slot therein, a rotatable transmission control tube disposed concentrically within said steering column and adapted for limited rotary movement therein, a cam on said tube, lever means for actuating said tube, an electrical switch secured to said steering column, oppositely facing paired contacts in said switch, slidable operating means for said switch, means integral with said operating means extending through said elongated slot for engagement with said cam, and contact bridging means yieldably disposed on said operating means to permit limited overtravel of said operating means.

7. The invention defined in claim 4 wherein said cam comprises a progressively stepped segmental flange member.

8. The invention defined in claim 4 wherein said contact bridging means comprises contact portions slidably disposed in each end of said slidable operating means, cap members on either end of said contact portions, and spring means disposed between one of said cap members on each of said contacts and said slidable operating means.

9. In combination, a steering column, rotatable transmission control means disposed concentrically within said steering column and movable from a neutral position through a plurality of forward positions to a reverse position, lever means for actuating said control means, a switch casing secured on said steering column, said casing having a pair of electrical contacts provided at each end thereof, means movable within said casing for bridging either of said contacts, cam means on said control means for actuating said movable means, and means on said movable means permitting said movable means to move a limited distance after bridging said contacts at either end of said casing.

10. In combination, a steering column, rotatable transmission control means disposed concentrically within said steering column and movable from a neutral position through a plurality of forward positions to a reverse position, lever means for actuating said control means, a switch casing secured on said steering column, said casing having a pair of electrical contacts embedded at each end thereof, means movable within said casing for bridging said contacts, means on said movable means permitting said movable means to move a limited distance after bridging said contacts, means integral with said bridging means extending into said steering column, cam means on said control means for engaging said integral means to actuate said bridging member in one direction, and spring means yieldably urging said bridging means in the opposite direction.

References Cited in the file of this patent

UNITED STATES PATENTS

| | | |
|---|---|---|
| 404,866 | Ricketson | June 11, 1889 |
| 404,867 | Ricketson | June 11, 1889 |
| 1,341,372 | Kissell | Mar. 25, 1920 |
| 1,853,513 | Douglas | Apr. 12, 1932 |
| 1,876,875 | Douglas | Sept. 13, 1932 |
| 2,324,819 | Butzbach | July 20, 1943 |
| 2,489,617 | Byram | Nov. 29, 1949 |
| 2,647,178 | Handy | July 28, 1953 |